US009862132B2

(12) United States Patent
Feigenblum et al.

(10) Patent No.: US 9,862,132 B2
(45) Date of Patent: Jan. 9, 2018

(54) METHOD AND DEVICE FOR PREHEATING A MOLD FOR INJECTION MOLDING

(71) Applicant: ROCTOOL, Le Bourget du Lac (FR)

(72) Inventors: Jose Feigenblum, Saint Paul (FR); Alexandre Guichard, La Chapelle du Mont du Chat (FR)

(73) Assignee: ROCTOOL, Le Bourget du Lac (FR)

( * ) Notice: Subject to any disclaimer, the term of this patent is extended or adjusted under 35 U.S.C. 154(b) by 395 days.

(21) Appl. No.: 14/408,672

(22) PCT Filed: Jun. 18, 2013

(86) PCT No.: PCT/EP2013/062570
§ 371 (c)(1),
(2) Date: Dec. 17, 2014

(87) PCT Pub. No.: WO2013/189907
PCT Pub. Date: Dec. 27, 2013

(65) Prior Publication Data
US 2015/0151471 A1    Jun. 4, 2015

(30) Foreign Application Priority Data

Jun. 18, 2012  (FR) ..................................... 12 55698
Jan. 26, 2013  (FR) ..................................... 13 50684

(51) Int. Cl.
*B29C 33/06*    (2006.01)
*B29C 33/08*    (2006.01)
(Continued)

(52) U.S. Cl.
CPC .......... *B29C 45/73* (2013.01); *B22D 17/2218* (2013.01); *B29C 33/06* (2013.01);
(Continued)

(58) Field of Classification Search
CPC ..... B29C 33/06; B29C 33/08; B29C 35/0805; B29C 2035/0811; B29C 2035/0816
See application file for complete search history.

(56) References Cited

U.S. PATENT DOCUMENTS 4,439,492 A * 3/1984 Wada ...................... B29C 33/06
                                                        264/403
2004/0222566 A1 * 11/2004 Park ........................ B29C 33/06
                                                        264/338
(Continued)

FOREIGN PATENT DOCUMENTS

AT          504784 A4    8/2008
AT          506097 A1 *  6/2009    ........... B29C 45/045
(Continued)

*Primary Examiner* — William P Bell
(74) *Attorney, Agent, or Firm* — Im IP Law; C. Andrew Im

(57) ABSTRACT

A method and device for pre-heating a first molding surface of a mold with an open position and a closed position defining a closed cavity between the first pre-heated molding surface and a second molding surface. A core is inductively heated outside the mold by placing the core inside a coil having an AC current passing there through. The core is inserted between the molding surfaces of the mold in the open position. The first molding surface is preheated by transferring the heat between the core and the first molding surface. The core is then removed and the mold is closed.

18 Claims, 4 Drawing Sheets

(51) Int. Cl.
 B29C 35/08 (2006.01)
 B29C 45/73 (2006.01)
 B22D 17/22 (2006.01)
 B29C 45/42 (2006.01)
 B29C 45/14 (2006.01)

(52) U.S. Cl.
 CPC ...... B29C 35/0805 (2013.01); B29C 45/7331 (2013.01); *B29C 45/42* (2013.01); *B29C 2035/0811* (2013.01); *B29C 2045/14877* (2013.01)

(56) References Cited

U.S. PATENT DOCUMENTS

2011/0140310 A1* 6/2011 Lin .................. B29C 33/06
 264/403
2011/0233826 A1 9/2011 Guichard et al.

FOREIGN PATENT DOCUMENTS

| AT | 506491 A1 * | 9/2009 | ........... B29C 45/332 |
|---|---|---|---|
| DE | 4308008 A1 | 9/1994 | |
| DE | 102008060496 A1 | 6/2009 | |
| FR | 2937270 A1 | 4/2010 | |
| WO | 2005/051571 A1 | 6/2005 | |
| WO | 2010/046582 A1 | 4/2010 | |

\* cited by examiner

METHOD AND DEVICE FOR PREHEATING A MOLD FOR INJECTION MOLDING

RELATED APPLICATIONS

This application is a §371 application from PCT/EP2013/062570 filed Jun. 18, 2013, which claims priority from French Patent Application Nos. 12 55698 filed Jun. 18, 2012 and 13 50684 filed Jan. 26, 2013, each of which is herein incorporated by reference in its entirety.

TECHNICAL FIELD OF THE INVENTION

The invention relates to a method and device for pre-heating a mold. The invention is more particularly, but not exclusively, suitable for pre-heating a mold used in a method for injection molding a plastic or metal in the liquid or pasty state and more specially the injection of material comprising reinforcements, for example in the form of short fibers.

BACKGROUND OF THE INVENTION

FIG. 1A relating to the prior art is a schematic representation of a mass-manufactured injected thin part (100). For example, this part is a cover for an electronic equipment. When it is large, for example, if it is a cover for a large-screen television set, said part is made of a polymer filled with reinforcement in the form of fibers or balls. Such a part (100) generally comprises a side (110), called the finish side, smooth or with a textured finish, which side is visible when said part is integrated into the device. In one particular embodiment, this side comprises a decoration, which is obtained by injecting the plastic in the mold while a decorative film is set against the inside of said mold. The part (100) also comprises a side, called the technical side, which comprises many relief features such as ribs (121), screw holes (122), grooves (123) etc. In FIG. 1B, the part (100) is made by hot injection of plastic comprising reinforcing filler in the enclosed cavity (153) of a mold (150). The mold thus comprises a fixed part (151) and a mobile part (152). The injected material is brought into the cavity (153) by a conduit (161) made in the fixed part, which conduit is connected to an injection device (160), for example a screw. In order to fill the whole cavity (153) and ensure an even appearance, particularly of the finish side of the part, the mold (150) must be pre-heated prior to injection so as to obtain uniform temperature at the surface of the cavity in contact with the injected polymer. In the case of a mass manufacturing method, the time taken to pre-heat and cool the mold should be reduced as much as possible. According to prior art, the molding surfaces of the mold, particularly the molding surface located on the fixed part of said mold, are for instance heated by heating devices placed in grooves or bores under said molding surfaces. These arrangements are difficult to make on large molds and make the molding surfaces mechanically fragile. Heating is carried out by conduction inside the very parts of the mold, and so a large volume of material is heated, leading to high energy expenditure, making the achievement of a high heating speed difficult.

In order to increase the heating speed, in the prior art, the surfaces of the mold on each side of the cavity can be heated by induction.

In FIG. 2, such a pre-heating method has been described in the document WO 2010 046582. According to that method of the prior art, the two parts (151, 152) of the mold are made up of an electrically conductive and ferromagnetic material, for example steel comprising a large proportion of ferritic phase. Advantageously, each of these two parts is enclosed in a carcass (251, 252) made of non-magnetic conductive material, such as copper (Cu), with the exception of the surfaces (261, 262) called the molding surfaces, which demarcate the cavity of the mold. An induction circuit (210) made up of one or more coils, surrounds the two parts (151, 152) of the mold. An intermediate part (270), called the core, made up of electrically conductive material, is placed between the two parts (151, 152) of the mold. The core is electrically insulated from the two parts (151, 152) of the mold. Thus placed, the core (270) comprises surfaces (271, 272) separated by a small distance from the molding surfaces (261, 262) of the two parts of the mold, thus demarcating two insulating gaps ($e_1$, $e_2$) with said molding surfaces. When high-frequency alternating current flows in the induction circuit, induced currents flow on the sides (261, 271, 262, 272) of the core and the molding surfaces opposite, on each side of these gaps, leading to the rapid heating of the ferromagnetic molding surfaces (261, 262). The high magnetic permeability of ferromagnetic steel makes the induced currents flow only on the surface, over a small depth from said molding surfaces. Thus, this pre-heating method makes it possible to rapidly inductively heat the molding surfaces, by concentrating the heating on those surfaces, when the core (270) is interposed between them, with the mold open. To carry out the injection, the core is removed, the mold (150) is closed by bringing the two parts (151, 152) closer, the material in the liquid or pasty state is then injected in the molding cavity through one or more conduits (not shown). The pre-heating temperature is controlled by the electrical power delivered to the induction circuit and by the heating time. That temperature is selected to be just sufficient to allow the easy flow of injected material throughout the entire cavity, wherein the heat of said material is then removed through the mass of the mold, which advantageously comprises a cooling circuit, for example by means of the circulation of fluid in cooling circuits (281, 282) placed in each part of the mold and extending through them just below the molding surface. Thus, the possibility of only heating the molding surfaces over a small thickness allows productivity gains both for heating and cooling.

While this method of the prior art is effective for pre-heating the molding surface of the finish side of the part, it is however not suitable for pre-heating the molding surface of the technical side. Indeed, the many relief features and technical arrangements on that side, such as drawers or slides, do not make it possible to easily obtain a constant gap between the core and the corresponding molding side; furthermore, these shape features disrupt the flow of induced currents, producing local overheating or even electrical arc phenomena.

The document AT 504784 describes a method and device for pre-heating a mold adapted to an injection molding method for plastic, comprising a device for pre-heating one of the molding sides of the mold by thermal radiation. In order to obtain the rapid pre-heating of said molding surface, that molding surface is made up of the side of a thin part distant from the mold body when said mold is in the open position. Thus, the volume of material heated by radiation is smaller. However, this embodiment is complex and cannot be adapted to the molding surface corresponding to the technical side of the part.

The document DE 10 2008 060496 describes a pre-heating method and device consisting in transferring part of the mold comprising the molding surface outside said mold to pre-heat it.

OBJECT AND SUMMARY OF THE INVENTION

In order to remedy the drawbacks of the prior art, the invention relates to a method for pre-heating a first molding surface of a mold, said mold comprising an open position and a closed position and defining, in said closed position, a closed cavity between said first pre-heated molding surface and a second molding surface, said method comprising the steps of:

a. inductively heating a part, referred to as a core, outside the mold by placing said part inside a coil having an AC current passing therethrough;
b. inserting said core between the molding surfaces of said mold in the open position;
c. carrying out the preheating of the first molding surface by transferring heat between said core and said molding surface;
d. removing the core and closing the mold.

Thus, the method according to the invention makes it possible to heat the core outside the mold, and concentrate the heating on the molding surface, without the difficulties relating to the shape of said molding surface which, according to this method, is heated by thermal transfer. The induction heating of the core is separated from the molding zone, and thus said molding zone is less crowded and easier to integrate in an injection press compared to the solutions of the prior art.

The invention can be implemented in the advantageous embodiments described below, which can be considered individually or in any technically operative combination.

In one particular embodiment, the step (c) is carried out by a transfer that is mostly carried out by thermal conduction. This embodiment allows rapid thermal transfer, and the heating of the core at a lower temperature, but requires contact between the molding surface and the core.

In another embodiment, the step (a) comprises heating the core to a temperature ranging between 700° C. and 1200° C. and step (c) is carried out by thermal transfer, mostly by radiation. This embodiment is more particularly suited to heating a complex molding surface comprising several relief features. The use of induction heating of the core outside the mold makes it possible to heat it to a high temperature for the rapid and contact-free pre-heating of the molding surface. Advantageously, the step (a) is carried out in an inert gaseous atmosphere. Thus, the surfaces of the core are preserved from oxidation at high temperature during the heating phase, which extends the life of said core.

Advantageously, the step (a) is carried out by placing the core between two electrically conductive thermal screens, electrically insulated from each other and the core, wherein the assembly is placed inside the coil. Thus, the core is heated faster and the mold and its technical environment are protected from thermal radiation from the core, which is heated to a high temperature during the phase of heating that core.

Advantageously, the mold includes a channel for the circulation of heat-transfer fluid extending under the first molding surface and the method according to the invention comprises, in this embodiment, before the step (c) a step of:

e. draining said channel of all fluids.

Thus, the drained cooling channel acts as a thermally insulating barrier between the molding surface and the remainder of the mold.

Advantageously, the second molding surface is also heated by thermal transfer during the step (c). Thus, the pre-heating of the two molding surfaces favors the even flow of the molded material between the molding surfaces and avoids the installation of residual stresses in the part made using the method according to the invention.

In an advantageous alternative of the method according to the invention, the method comprises, before step (d), a step of:

f. inductively pre-heating the second molding surface defining the closed cavity of the mold by placing opposite said surface an electrically conductive intermediate part, insulated electrically from said molding surface and forming a gap with that molding surface, wherein the corresponding part of the mold and said intermediate part are placed in a coil having an AC current passing therethrough.

This alternative embodiment of the method according to the invention makes it necessary for the mold to also have an induction circuit. This alternative embodiment is particularly, but not exclusively, suitable for the case of molding comprising a decorative film set against the second molding surface and makes it possible to pre-heat that second molding surface without damaging said film by burning.

In a particular embodiment of this alternative of the method according to the invention, the intermediate part is made up of the core and the step (f) is carried out at the same time as the step (c) while means carry out electrical conduction between the core and the first molding surface pre-heated by thermal transfer. Thus, during the same pre-heating operation, the two molding surfaces of the mold are heated to an appropriate pre-heating temperature, wherein the first molding surface is only heated by thermal transfer and the second molding surface is heated mostly by induction.

Advantageously, the second molding surface is covered with plastic decorative film at the time the step (f) is carried out and it comprises, after step (d), a step of:

g. injecting molten plastic material in the closed cavity of the mold.

The invention also relates to a device for implementing the method according to the invention, for pre-heating a mold comprising an open position and a closed position and defining, in that closed position, a closed cavity between a first molding surface and a second molding surface, said device comprising:

i. a core;
ii. induction means, separate from the mold, for induction heating of the core, inside a coil, in a heating zone;
iii. means to transfer the core between the heating zone and the mold.

Thus, the method according to the invention is implemented in an automated manner.

In one alternative of the device according to the invention, the core is made up of a graphite block. This material, which is electrically conductive, can be inductively heated to a high temperature and has an emissivity coefficient close to 1, favoring thermal transfer by radiation.

In a second alternative of the device according to the invention, the core is made up of a metallic ferromagnetic material having a surface opposite the first molding surface during pre-heating comprising a coating with emissivity above 0.9. This alternative embodiment makes it possible to obtain faster heating of the core while retaining the high emissivity of the surface of the core in order to favor thermal transfer by radiation.

Advantageously, the coating of the core in this second alternative of the device according to the invention is made of amorphous carbon. That coating is particularly resistant to oxidation.

Advantageously, the core is hollow. Thus, the mass of said core is small, which makes it faster to heat and easier to handle.

Advantageously, the transfer means of the device according to the invention comprise a robot, wherein said robot further comprises means for stripping the part made in the cavity of the mold. Thus, the same transfer device is used to strip the part and to insert the core between the parts of the mold, which makes the device more compact and improves molding productivity by combining tasks during the same motion of said robot.

Advantageously, the means for induction heating of the device according to the invention comprise:

- v. a first screen made of electrically conductive but non-ferromagnetic material;
- w. a second screen made of electrically conductive but non-ferromagnetic material;
- x. means to bring the two screens closer to and further away from each other and means to hold the core between the two screens when they are close to each other;
- y. an inductor comprising a coil surrounding the two screens, which coil is made up of two half-coils each connected to one of the screens and comprising connectors so that electrical continuity between the two half-coils is provided when the two screens are close to each other;
- z. means to electrically insulate the core from the two screens and create a gap between the sides of the core opposite the sides of the screens.

Thus, the core is heated rapidly by induction by creating two gaps and the environment is protected from radiation from the core by the screens.

Advantageously, the screens are hollow. Thus, they are easier to handle and the device is more compact.

Advantageously, the screens comprise an internal cooling circuit for the circulation of heat-transfer fluid. Thus, the device may be used at a high speed with no risk of damaging the screens due to overheating by exposure to radiation from the core.

The invention also relates to a device for the injection molding of a product in the liquid or pasty state in the cavity of a mold comprising two parts that are mobile in relation to each other and define between them a closed cavity contained between two molding surfaces, which device comprises a pre-heating device according to any of the previous embodiments.

Advantageously, the molding surface, pre-heated mostly by thermal radiation, comprises a coating with emissivity above 0.9. Thus, the thermal transfer by radiation between that molding surface and the core is improved.

BRIEF DESCRIPTION OF THE DRAWINGS

The invention is described below in its preferred embodiments, which are not limitative in any way, and by reference to FIGS. 1 to 8, in which:

FIG. 1A: an example of a part made by plastic injection comprising a finish side and a technical side and, FIG. 1B: a sectional view of an exemplary embodiment of a mold for manufacturing such a part;

in FIG. 4.

DETAILED DESCRIPTION OF THE EMBODIMENTS

Figure 1:
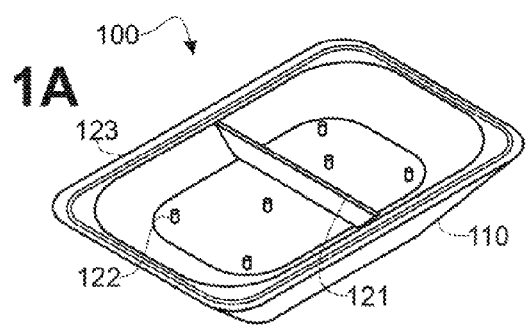
FIG. 1 of the prior art shows, in a perspective view.
Figure 1:
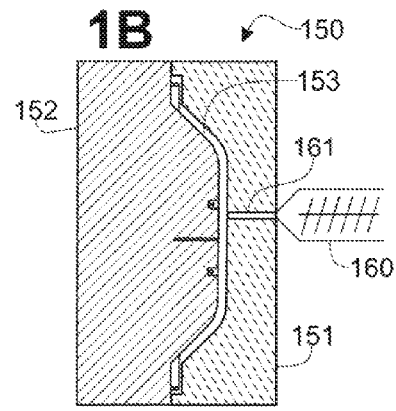
Figure 2:
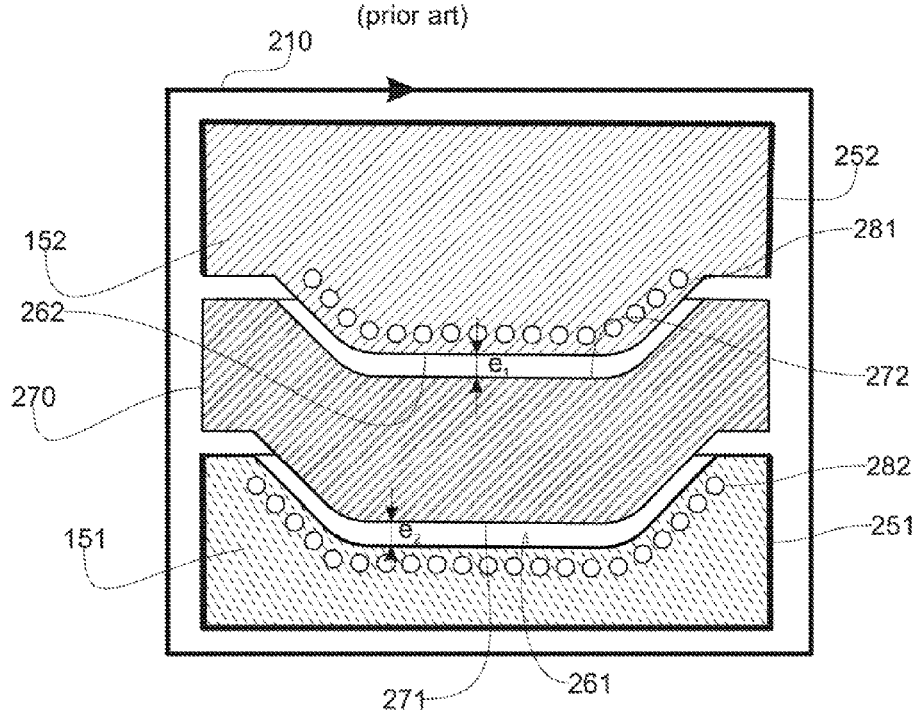
FIG. 2, also of the prior art, is a sectional view of an exemplary embodiment of a device for the induction pre-heating of the molding surfaces of a mold.
Figure 3:
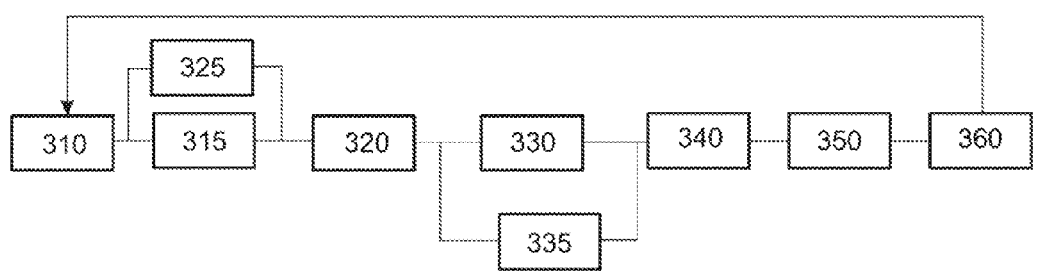
FIG. 3 is a synopsis of an exemplary embodiment of the method according to the invention.

In FIG. 3, an exemplary embodiment of the pre-heating method according to the invention is implemented in an injection molding method. In a first step (310) known as the opening step, the mold is open. During a stripping step (315), the part made is stripped and removed. At the same time, during a heating step (325), the core is heated by induction. During an insertion step (320) the hot core is inserted between the two open parts of the mold. The parts of the mold are brought closer to each other, so as to enclose the core, during a pre-heating step (330). During that pre-heating step, at least one of the molding surfaces of the mold, which is in contact with the core or close to it, is heated by thermal transfer. That thermal transfer is carried out by conduction, convection or radiation depending on the embodiment of the device according to the invention.

In a second embodiment, the method comprises a step (335) for the induction heating of one of the molding surfaces, carried out when the core has been introduced in the mold.

Thus, at least one of the molding surfaces of the mold, preferably the molding surface that makes the technical side of the molded part, is heated by thermal transfer using conduction, convection or radiation, and the molding surface that makes the finish side of the molded part is heated by thermal transfer or induction. When the molding surfaces of the mold reach an appropriate temperature, the mold is opened and the core is removed during a removal step (340). Then the mold is closed again (350) under pressure so as to constitute a sealed cavity between the molding surfaces of said mold. The material that makes up the part is injected in the mold during an injection step (360), which injection step is followed by a cooling step. Then the mold is opened once again (310) to strip (315) the part.

Figure 4:
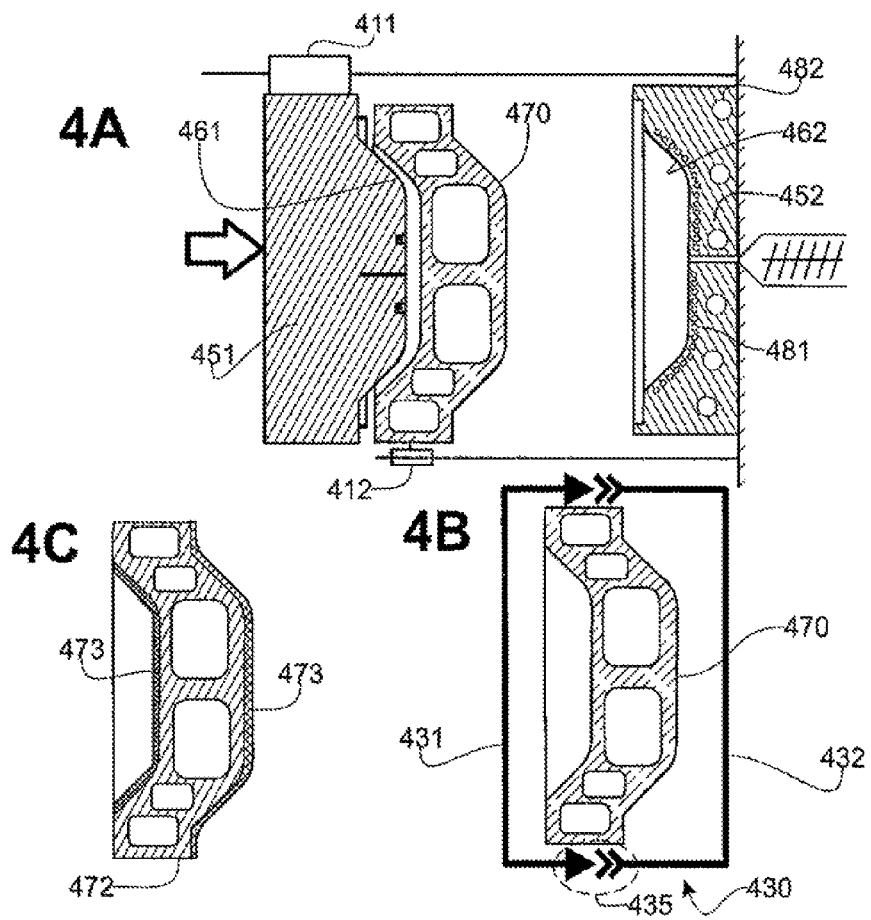
FIG. 4A is a sectional view of an exemplary embodiment of the device according to the invention comprising, in FIG. 4B, a separate heating device for the core, in FIG. 4C an embodiment of the core comprising a substrate and a coating with emissivity close to 1.

In FIG. 4A of an exemplary embodiment of the device according to the invention, the mold comprises a fixed part (452), which, in this example, comprises a molding surface (462) that molds the finish side of the final part and a mobile part (451) with a molding surface (461) that molds the technical side of the final part. The mobile part (451) is connected to slide (411) in relation to the fixed part (452) of the mold so as to allow the opening and closing of the cavity defined by the molding surfaces (461, 462) of the two parts (451, 452) of the mold. A pre-heating core (470) is connected to means (412) known as transfer means, for moving said core (470) between a position, FIG. 4A, in which the core is located between the two parts (451, 452) of the mold and a position, FIG. 4B, where the core is separated from the mold, in which said core (470) may be heated to a determined temperature, in a zone known as the heating zone. In one exemplary embodiment, these transfer means are made up of a robot or a manipulator, symbolized in FIG. 4A by a sliding pivot connection that allows rotation over at least 90° to place the core (470) between the two parts (451, 452) of the mold or remove it from there, and by a displacement movement substantially perpendicular to the closing plane of the mold, move said core (470) closer to or further away from either of the molding surfaces (461, 462). Advantageously, the manipulator (412) comprises means (not shown) for stripping the part made during the molding operation. Thus, the same manipulator is used in a cycle comprising, with the mold open, the stripping of the part that remains adhering to the technical molding side (461), wherein such stripping is carried out by a displacement movement substantially perpendicular to the mold parting face, then the removal of the part by a rotation movement around that direction, while the core is heated in the heating zone. The manipulator then grasps the hot core and introduces it between the two parts (451, 452) of the mold. Those skilled in the art adapt the device depending on the motions and the dimensions of the mold and the part made.

In FIG. 4B of an exemplary embodiment, the heating zone includes an induction circuit comprising an inductor (430) made up of two half-coils (431, 432) connected by prongs (435) and which, once connected, surround the core (470). In this exemplary embodiment, the core is made up of a material or an assembly of materials, so that said core can be heated rapidly by induction. As the core (470) is not subjected to high mechanical stresses, a wide choice of materials or assembly of materials is possible. In a first exemplary embodiment, the core (470) is made up of graphite. That material can be heated by induction to a very high temperature, above 1000° C. and has emissivity close to 1, producing high thermal radiation.

In FIG. 4C, alternatively, the core comprises a substrate (472) made of ferromagnetic material, which speeds up its induction heating. In one exemplary embodiment adapted to the heating of a molding surface (461, 462) by radiation, said substrate comprises, on all or part of its exterior surfaces, coating (473) made for example of amorphous carbon, for increasing the emissivity of these surfaces. Advantageously, the substrate is selected so as to have a high Curie temperature, above 700° C. As non-limitative examples, iron (Fe) and cobalt (Co) based alloys or iron (Fe) and silicon (Si) based alloys make it possible to reach such a Curie temperature. The high cost of these materials is made up for by the small dimensions of the core (470). The core is not subjected to mechanical stresses, and is, according to exemplary embodiments, made up of a plain sheet of coated metal or a hollow body, which also makes it easier to manipulate by the manipulator (412) and reduces the heating time.

In FIG. 4B, the frequency of the alternating current flowing in the inductor (430) ranges between 10 kHz and 100 kHz and may be adapted depending on the nature of the material making up the core (470).

After it is heated to the required temperature, the core (470) is transferred between the two parts (451, 452) of the mold. According to a first exemplary embodiment, the core (470) heated in this way is put in contact with one of the molding surfaces (461), which is then heated by conduction. In another exemplary embodiment, said molding surface (461) is heated with no contact by radiation and convection. When the core (470) is made of graphite, its emissivity coefficient is greater than 0.95 and a large part of the thermal energy absorbed during the core heating phase is re-emitted by radiation. Thus, in this embodiment, the core (470) is preferably heated to a high temperature, for example, 1000° C. In order to avoid the accelerated degradation of the graphite by oxidation at a high temperature, the heating zone is advantageously contained in a protective atmosphere of inert gas during the heating of the core.

When the core is placed close to the molding surface to heat, the thermal flow emitted to that surface by radiation reaches values of approximately $150.10^3$ W·m$^{-2}$. Such a thermal flow allows the rapid heating of the molding surface, without any contact with it, and is efficient even if said surface comprises many relief features, like the molding surface (461) of the technical side of the molded part. To improve thermal transfer by radiation between the core (470) and said molding surface (461), the surface is advantageously coated with coating with emissivity close to 1. This effect is obtained, as non-limitative examples, by amorphous carbon coating deposited using Physical Vapor Deposition or PVD on said molding surface (461), by chemical treatment known as burnishing of the surface or by electrolytic deposition of black chrome plating.

In another exemplary embodiment, the two parts (451, 452) of the mold are brought closer to each other after the core has been introduced between them, so that the two molding surfaces (461, 462) are heated by thermal transfer. According to alternative embodiments:

the two molding surfaces (461, 462) are heated by conduction by contact with the core (470);

the two molding surfaces (461, 462) are heated by radiation and convection and by keeping them out of contact with the core (470);

one of the molding surfaces is heated by radiation and convection and the other molding surface is heated by conduction.

In FIG. 4A, advantageously, one of the parts of the mold (452) or both parts of the mold, comprise channels (481, 482) for the circulation of heat-transfer fluid. Thus, in one exemplary embodiment, the fixed part of the mold (452), which makes the finish side of the part, comprises channels (482) for heating that part and channels (481) close to the molding surface (462) for cooling the cavity. In one exemplary embodiment (not shown), the mobile part (451) also comprises cooling channels close to the corresponding molding surface (461). Advantageously, said cooling channels (481) are drained before the relevant molding surface (461, 462) is heated by thermal transfer, so as to limit the thermal transfer between said molding surface and the remainder of the mold.

Figure 5:
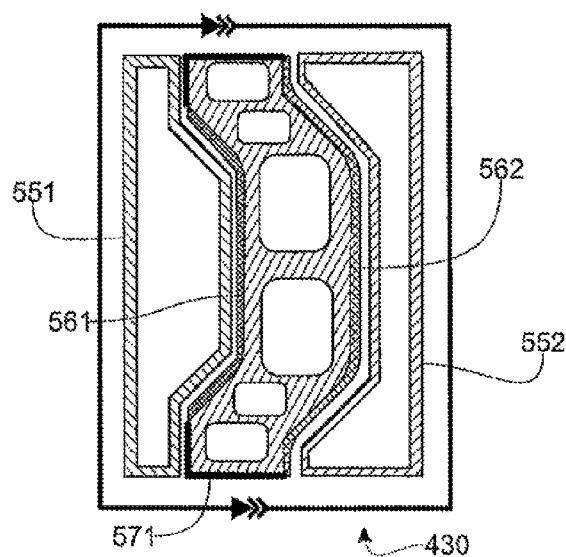
FIG. 5 is a sectional view of an exemplary embodiment of the induction heating zone of the core, which heating zone comprises two screens creating two gaps with the surfaces of the core.

In FIG. 5 of an exemplary embodiment of the heating zone, the core (470) is placed there between two screens (551, 552) made of electrically conductive but non-ferromagnetic material, for example copper. The core (470) is electrically insulated from these two screens so as to create gaps between the surfaces of the core and the surfaces of the screens (551, 552) opposite them. In one exemplary embodiment, the core (470) is enclosed in a carcass (571) that is electrically conductive but non-ferromagnetic, for example in copper, away from the zones (561, 562) to be heated. The assembly is placed inside the coil of the inductor (430), when alternative current flows through said heating inductor, the heating is concentrated on the surfaces (561, 562) of the core to be heated. Thus, the heating of the core is accelerated. The surface of said screens (551, 552) is preferably polished, so that it reflects the thermal radiation of the core (470). In an exemplary embodiment, said screens are further cooled, for example by circulating heat-transfer fluid, so that they are protected from excessive heating by convection due to their closeness to the core (470) heated to a high temperature.

Figure 6:
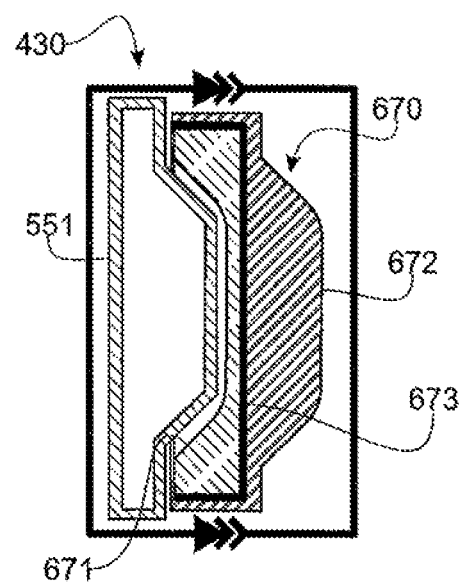
FIG. 6 is a sectional view of an exemplary embodiment of a core comprising an assembly of two materials and an exemplary embodiment of a core heating zone adapted to that embodiment.

In FIG. 6, in another exemplary embodiment, the core (670) is made up of an assembly comprising two materials. A first block (672) is made of electrically conductive but non-ferromagnetic material, for example a copper or aluminum alloy. That block (672) encloses a second block (671) intended to be heated to a high temperature by induction. The second block (671) is as a non-limitative example made of graphite or ferromagnetic steel with a high Curie temperature that has optionally been treated with emissivity coating close to 1. In one embodiment, the second block (671) is thermally insulated from the first block (672) by a layer (673) made of thermally insulating material that is electrically conductive, and resistant to high temperature. As a non-limitative example, that thermal insulation layer is made of silicon and aluminum oxynitride ceramic (SiAlON). Alternatively, said thermal insulation layer (673) is itself composite. When this composite core (670) is placed in an induction circuit opposite an electrically conductive screen (551), the surface of the second block (671) is rapidly heated to a high temperature while the first block (672) making up said core is not much heated.

Figure 7:
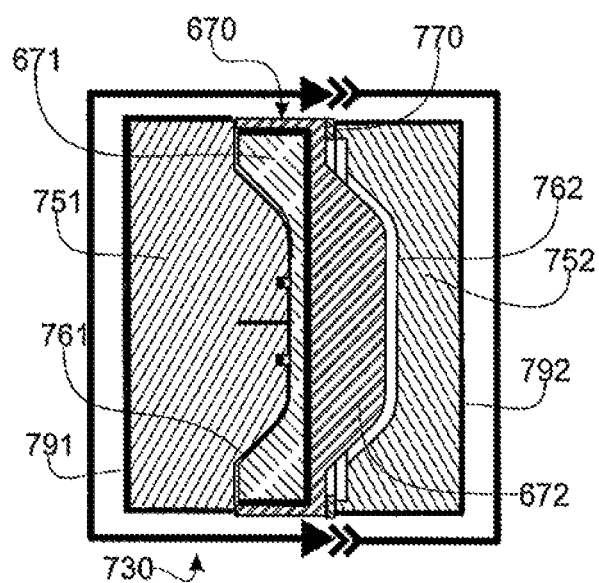
FIG. 7 is a sectional view of an exemplary embodiment of the device according to the invention, using a core made up of two assembled parts as shown in FIG. 6, wherein one of the molding surfaces is heated by thermal transfer and the other molding surface by induction.

In FIG. 7, such a composite core (670) is, in one exemplary embodiment, used for combined heating using thermal transfer by conduction, convection or radiation of one of the molding surfaces of the mold, preferably the molding surface (761) corresponding to the technical side of the part made, while the other molding surface (762) of said mold corresponding to the finish side is heated by induction. Each part of the mold (751, 752) is made, for example, of ferromagnetic steel and is enclosed in a carcass (791, 792) made of electrically conductive material, for example copper. In that exemplary embodiment, the first block (672) of the core is electrically insulated, for example using insulating blocks (770), from the part of the mold (752) comprising the molding surface (762) corresponding to the finish side of the part, so as to constitute a gap between that molding surface and the first block (672) of the core (670). The second block (671) of the core, which has first been heated by induction, is placed in contact with or close to the molding surface (761) corresponding to the technical side of the part, so as to provide electrical continuity between that molding surface (761) and the first block (672) of the core (670). The assembly is placed inside the coils of an induction circuit (730), when said circuit is powered by high-frequency alternating current, the molding surface (762) opposite the first block (672) of the core (670) is heated by induction, while the molding surface (761) for the technical side of the part is heated by thermal transfer between that molding surface and the second block (671) of the core. This embodiment is more particularly adapted to cases where decorative film is placed on the molding surface (762) corresponding to the finish side of the part before injection and before pre-heating. Indeed, heating of that molding surface by thermal transfer would create the risk of burning the decorative film.

Figure 8:
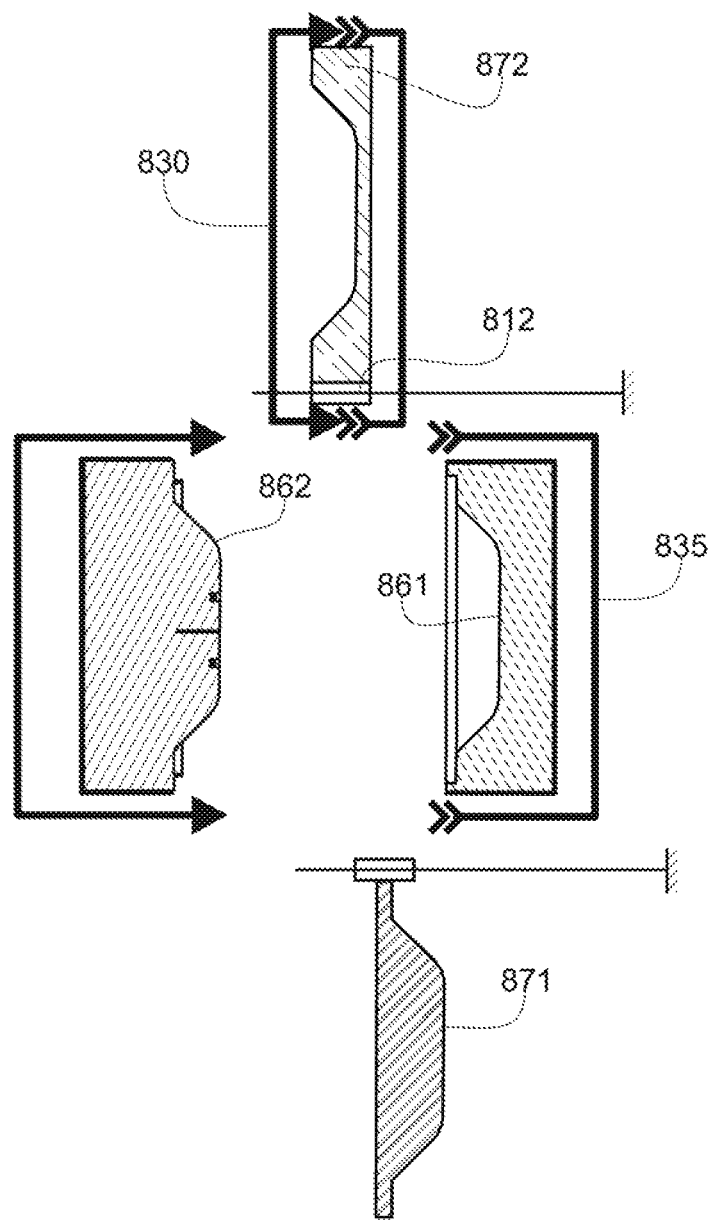
FIG. 8 is an exemplary embodiment of the device according to the invention comprising a core in two separable parts, one of the parts of which is pre-heated by induction before it is assembled with the other part of said core.

In FIG. 8 of an alternative to the previous embodiment, the core is made of two separate parts (871, 872) assembled at the time of their introduction between the two parts of the mold. A first part of said core is heated by induction in an induction circuit (830) separate from the mold, prior to the introduction of said first part of the core between the two parts of the mold by a first manipulator (812). In this embodiment, that first part (872) of the core is placed in contact with the molding surface (862) corresponding to the technical side of the part in order to heat that surface by conduction. The second part (871) of the core is made of electrically conductive but non-ferromagnetic material, such as a copper or aluminum alloy. That second part (871) of the core is placed opposite the molding surface (861) corresponding to the finish side of the part, electrically insulated from the molding surface and separated from it by a gap, while means (not shown) allow electrical continuity between the molding surface (862) corresponding to the technical side of the part and the second part (871) of the core. The assembly is placed inside the coils of an induction circuit (835) by enclosing the mold, and so the molding surface (861) corresponding to the finish side of the part is thus heated by induction.

The description above and the embodiments show that the invention achieves its objectives; in particular, the method and device according to the invention allow the rapid and direct pre-heating of the molding surfaces of an injection mold without complex machining of the mold and without weakening the mold. Thus, part of the means of the device according to the invention may be shared by several molds, and only the core needs to be adapted to the shape of the part, which core is advantageously made of easily machined material.

The invention claimed is:

1. A method for pre-heating a first molding surface of a mold comprising an open position and a closed position defining a closed cavity between the first pre-heated molding surface and a second molding surface, comprising the steps of:
   inductively heating a core outside the mold by placing the core inside a coil having an AC current passing there through;
   inserting the core between the first and second molding surfaces of the mold in the open position;
   pre-heating of the first molding surface by transferring heat between the core and the first molding surface; and
   removing the core and closing the mold.

2. The method according to claim 1, further comprising the step of transferring the heat to preheat the first molding surface substantially by thermal conduction.

3. The method according to claim 1, further comprising the steps of heating the core to a temperature ranging between 700° C. and 1200° C.; and transferring the heat to preheat the first molding surface by thermal radiation.

4. The method according to claim 1, further comprising the step of inductively heating the core outside the mold in an inert gaseous atmosphere.

5. The method according to claim 1, further comprising the step of placing the core between two electrically conductive thermal screens, electrically insulated from each other and the core, an assembly of the core and two electrically conductive thermal screens is placed inside the coil.

6. The method according to claim 1, wherein the mold comprises a channel to circulate a heat-transfer fluid extending under the first or second molding surface; and further comprising the step of draining the channel of all fluids before the step of preheating the first molding surface.

7. The method according to claim 1, further comprising the step of preheating the second molding surface by thermal transfer.

8. A pre-heating device for pre-heating a mold comprising an open position and a closed position defining a closed cavity between a first molding surface and a second molding surface, comprising:
- a core;
- an induction circuit, separate from the mold, to inductively heat the core, inside a coil having an AC current passing there through, in a heating zone; and
- a manipulator to transfer the core between the heating zone and the mold between the first and second molding surfaces in the open position to pre-heat first molding surface by transferring heat between the core and the first molding surface.

9. The pre-heating device according to claim 8, wherein the core comprises a graphite block.

10. The pre-heating device according to claim 8, wherein the core comprises a coating with emissivity above 0.9 and a metallic ferromagnetic material having a surface positioned opposite the first molding surface during pre-heating of the first molding surface.

11. The pre-heating device according to claim 10, wherein the coating of the core comprises an amorphous carbon.

12. The pre-heating device according to claim 8, wherein the core is hollow.

13. The pre-heating device according to claim 8, wherein the manipulator comprises a robot configured to strip a part made in the cavity of the mold.

14. The pre-heating device according to claim 8, wherein the induction circuit comprises:
- a first screen comprising electrically conductive and non-ferromagnetic material;
- a second screen comprising electrically conductive and non-ferromagnetic material;
- an assembly to bring the first and second screens closer to and further away from each other, and to hold the core between the two screens;
- an inductor comprising a coil surrounding the first and second screens and comprising two half-coils, each half-coil connected to one of the screens and comprising connectors to provide an electrical continuity between the two half-coils;
- an insulator to electrically insulate the core from the first and second screens and provide a gap between sides of the core opposite sides of the first and second screens.

15. The pre-heating device according to claim 14, wherein the first and second screens are hollow.

16. The pre-heating device according to claim 14, wherein the screens comprise an internal cooling circuit for the circulation of heat-transfer fluid.

17. An injection device for injecting a product in a liquid or pasty state in a cavity of a mold comprising two parts that are mobile in relation to each other and define there between a closed cavity within two molding surfaces, further comprising the pre-heating device according to claim 8.

18. The injection device according to claim 17 wherein each molding surface is pre-heated substantially by thermal radiation and comprises a coating with emissivity above 0.9.

* * * * *